(12) United States Patent
Reuter et al.

(10) Patent No.: US 6,533,373 B2
(45) Date of Patent: Mar. 18, 2003

(54) CABLE CONDUIT FOR A SWITCHGEAR CABINET WITH A RACK

(75) Inventors: Wolfgang Reuter, Burbach (DE); Matthias Müller, Haiger (DE); Martina Köhler, Herborn (DE); Heinz Schmitt, Dietzhölztal (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/780,535

(22) Filed: Feb. 9, 2001

(65) Prior Publication Data

US 2001/0022490 A1 Sep. 20, 2001

(30) Foreign Application Priority Data

Feb. 17, 2000 (DE) .......................................... 100 07 334

(51) Int. Cl.⁷ .................................................. A47F 5/00
(52) U.S. Cl. .................................. 312/223.6; 312/265.4
(58) Field of Search ........................... 312/265.1, 265.2, 312/265.3, 265.4, 223.1, 223.6; 108/50.02; 211/26; 174/50, 59, 60; 361/826

(56) References Cited

U.S. PATENT DOCUMENTS 4,869,380 A * 9/1989 Metcalfe et al.
5,749,476 A * 5/1998 Besserer et al. ............... 211/26
6,113,198 A * 9/2000 Hommes ............. 312/223.6 X
6,259,604 B1 * 7/2001 Kuster

* cited by examiner

Primary Examiner—Janet M. Wilkens
(74) Attorney, Agent, or Firm—Pauley Petersen Kinne & Erickson

(57) ABSTRACT

A cable conduit for a switchgear cabinet, having a rack assembled from rack legs, at least a part of which have several profiled sides on an inside facing an interior, which extend at an angle with respect to each other and to a diagonal line of the rack and have a row of fastening receivers, wherein the cable conduit has a U-shaped profiled receiving section with a base leg and two lateral legs and can be closed by a cover section, which can be locked on the lateral legs. A dependable attachment of the cable conduit with an optimal cable reception space is achieved because the base leg of the profiled receiving section is matched to at least a portion of the contour defined by the profiled sides of the inside of a frame leg, or the profiled sides of the insides of two frame legs which are connected with each other, and can be connected with the profiled sides.

9 Claims, 2 Drawing Sheets

CABLE CONDUIT FOR A SWITCHGEAR CABINET WITH A RACK

BACKGROUND OF THE INVENTION

1. Field of the Invention

This invention relates to a cable conduit for a switchgear cabinet, having a rack assembled from rack legs, at least a part of which have several profiled sides on the inside facing the interior, which extend at an angle with respect to each other and to a diagonal line of the rack and have a row of fastening receivers. The cable conduit has a U-shaped profiled receiving section with a base leg and two lateral legs and can be closed by a cover section, which can be locked on the lateral legs.

2. Description of Related Art

Cable conduits of U-shaped cross section are known from the prior art. A base leg has fastening bores, so that it can be easily applied to level fastening surfaces. In the switchgear cabinet, mounting rails and frame legs of the rack having appropriately large profiled sides with rows of fastening receivers, offer such fastening surfaces.

Frame legs for a rack of a switchgear cabinet are increasingly used today, having a contour toward an interior which has several profiled sides extending at different angles with respect to each other and to the diagonal line of the rack, and which therefore complicate attachment of the U-shaped cable conduits.

SUMMARY OF THE INVENTION

It is one object of this invention to provide a cable conduit of the type mentioned above but which can also be applied to a frame leg or to two frame legs connected with each other, even if the frame legs have a more or less complicated contour of the profiled sides toward the interior.

In accordance with this invention, a base leg of the profiled receiving section is matched to at least a portion of a contour defined by profiled sides of an inside of a frame leg, or the profiled sides of the insides of two frame legs which are connected with each other, and can be connected with the profiled sides.

Matching the base leg of the cable conduit to at least one of the inner contours of the frame leg or frame legs provides a flush contact with at least two profiled sides. This permits a support and connection over a large surface between the frame leg and the cable conduit. The support between the two parts is thus considerably improved, because an alignment in the linear direction simultaneously occurs because the cable conduit is maintained free of twisting, due to the meshing of the contours of the frame leg and the cable conduit base leg, even if only a few fastening points are selected.

This interlocking is achieved in the simplest way because the base legs have sections which are aligned parallel with the profiled sides of a frame leg and form a contact contour, which is essentially complementary to the contour of the inside of the frame leg. The base leg can have sections which are aligned parallel to the profiled sides of two frame legs connected with each other, and form a contact contour which is essentially complementary to the contour of the insides of the two frame legs.

If in the area of the diagonal line of the rack the frame leg has a connecting section, to which added parts can be attached by fastening screws, in one embodiment the connecting section is bridged by a transition section of the base leg of the cable conduit which is located at a distance from the connecting section, in order to provide space for the fastening screws.

In one embodiment, frame legs are designed mirror-reversed with respect to the diagonal line of the rack.

In a further embodiment, the lateral legs are divided by slits into individual spring tabs. It is thus possible to conduct cables in and out at various points in the linear direction of the cable conduit, and to simplify the locking of the cover section on the cable conduit.

For fastening the cable conduit on the frame leg, or legs, the sections of the cable conduit which can be contacted with the profiled sides have fastening bores, which can be brought into congruency with the fastening receivers of the profiled sides of the frame leg or legs.

BRIEF DESCRIPTION OF THE DRAWINGS

This invention will be explained in greater detail in view of embodiments shown in sectional views in the drawings, wherein.

DESCRIPTION OF PREFERRED EMBODIMENTS

Figure 1:
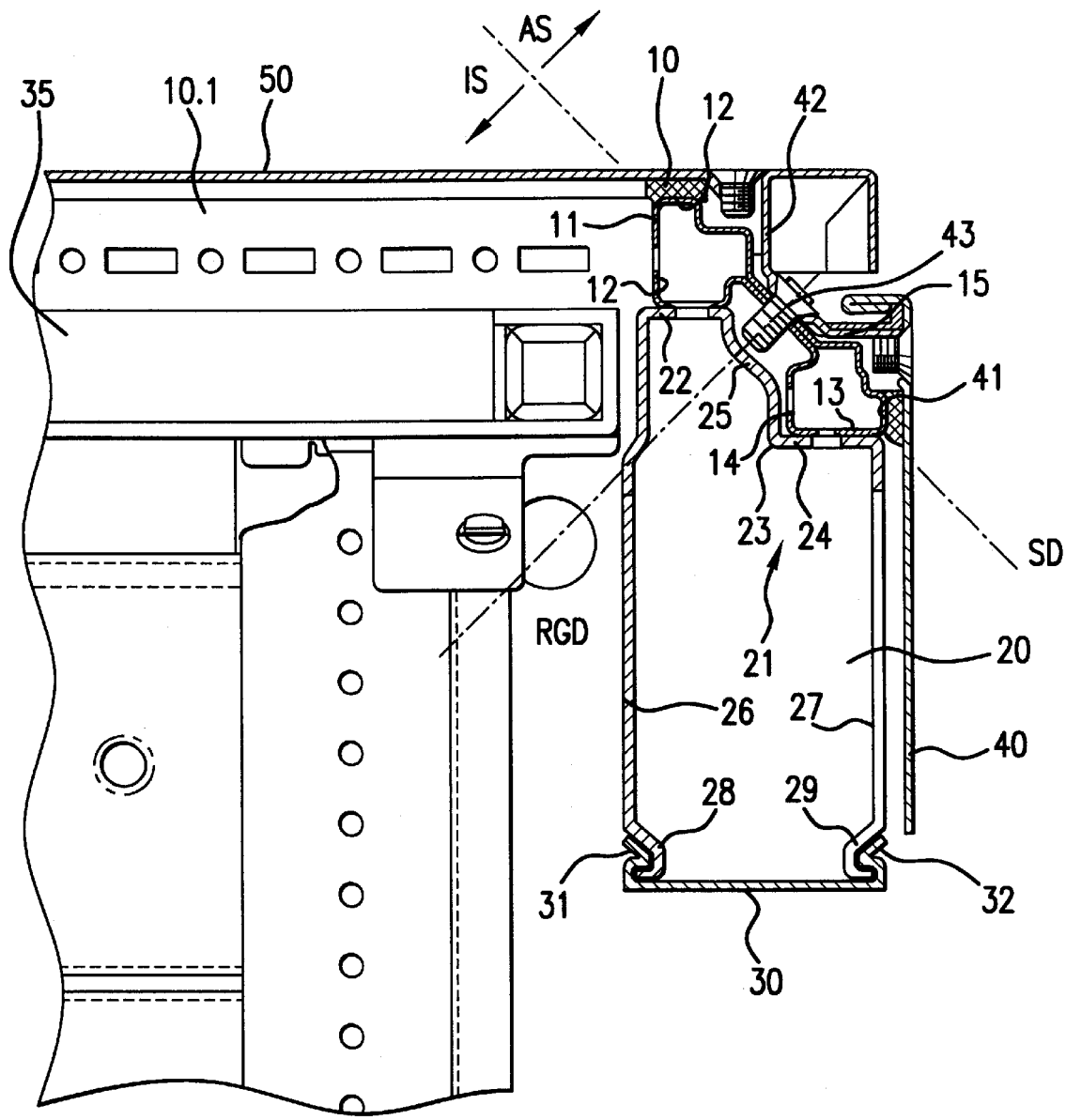
FIG. 1 is a horizontal section taken through a vertical rear frame leg of a switchgear cabinet rack with a cable conduit attached.

As the sectional view in FIG. 1 shows, a frame leg 10 forms a vertical corner of a rack, which is completed in a known manner by adjoining horizontal frame legs 10.1, as well as by frame legs (not shown) located below and above the frame 10. So that the frame legs can assume a multitude of fastening functions toward the interior, and so that they have excellent stability and torsion-resistance, along with a small cost for material, they have a complicated cross section. So that their use is possible at all points of the rack, the cross section of the frame leg 10 is mirror-reversed with respect to the diagonal line RGD of the rack. As indicated by the line SD, which extends perpendicular with respect to the diagonal line RGD of the rack, the frame leg 10 has an inside IS and an outside AS, which are formed by several profiled sides with rows of fastening receivers and form inner and outer contours of different types. In the direction toward an imagined outer wedge corner, the outside AS delimits a free space for the lateral walls 40 and the rear wall 50 of the switchgear cabinet, wherein a fastening element 42 is attached with a screw 43 to the frame leg 10, on which the lateral walls 40 and the rear wall 50 are fastened by flathead screws to the fastening element 42. The contact points are sealed by sealing elements 41. If a mounting plate 35 extends parallel and a short distance away from the rear wall 50, it is possible to attach a vertical cable conduit 20 to the frame leg 10, which can extend from the upper to the lower horizontal frame leg.

The base leg 21 of the cable conduit 20 extends over a portion of the inside IS of the frame leg 10 with the profiled sides 12, 13 and 14, and rests against them with the sections 22 and 24, as well as partially with the section 23, of the base leg 21. The sections 22 and 23 are connected with each other via a transition section 25, which bridges the connecting section 15 of the frame leg 10 and is spaced apart from it in order to provide space for the fastening screws 43. The profiled side 11 of the inside IS of the frame leg 10 is not occupied by the base leg 21 of the cable conduit 20. The facing contours of the frame leg 10 and the base leg 21 of the cable conduit 20 are essentially complementary and matched to each other so that a sufficiently large contact surface is achieved. In addition, a contact which is torsion-resistant is created between the cable conduit 20 and the frame leg 10.

The two lateral legs 26 and 27 of the cable conduit 20 delimit a cable reception space, which optimally is matched to the contour of the inside IS of the frame leg 10. The lateral legs 26 and 27 of the cable conduit 20 are routed in locking receivers 28 and 29, in which the angled locking shoulders 31 and 32 of the cover section 30, which closes the cable reception space of the cable conduit 20, are locked.

Figure 2:
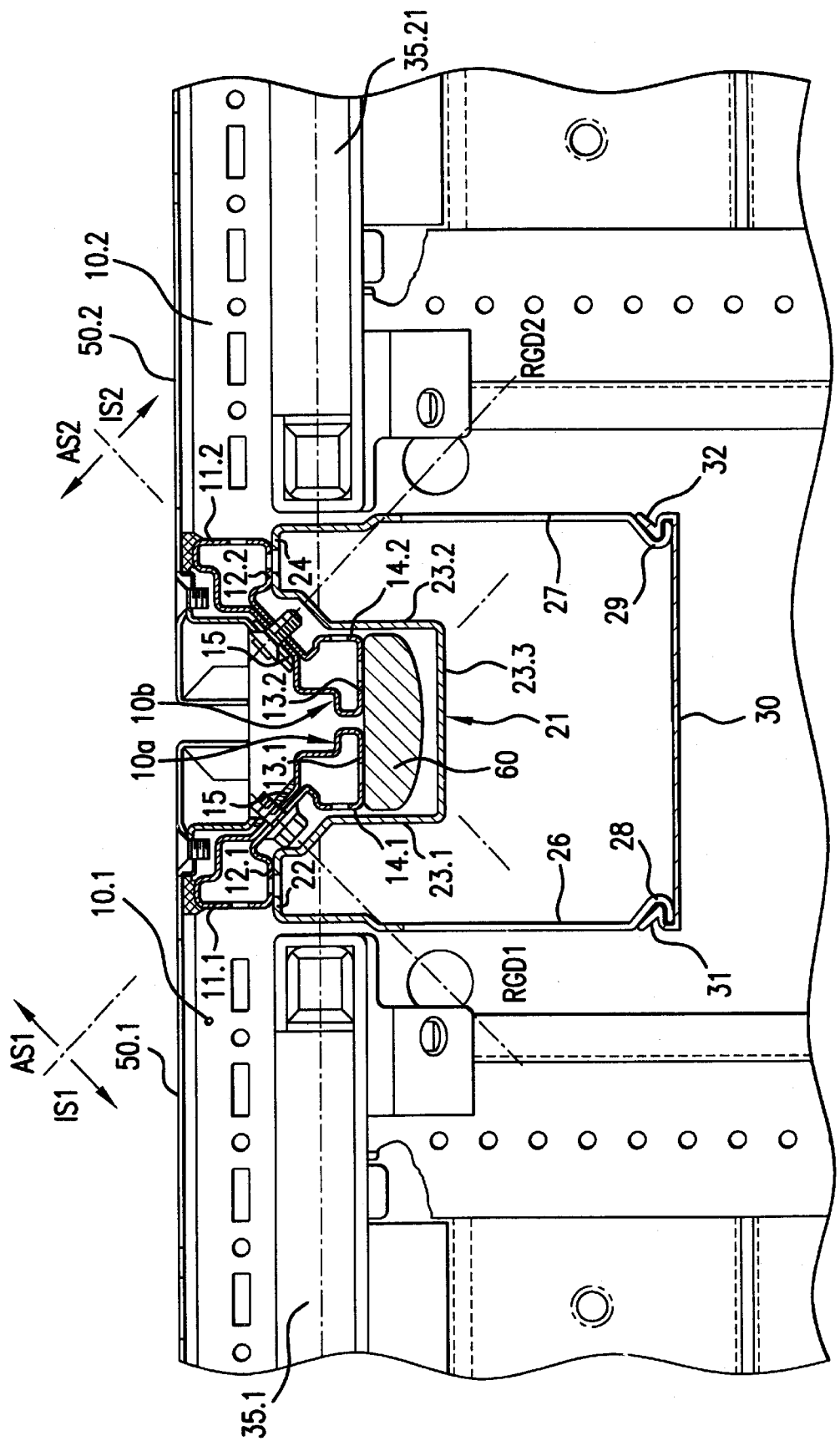
FIG. 2 is a horizontal section taken through two vertical rear frame legs of two switchgear cabinets, joined at the sides and connected with each other, and through a cable conduit extending over both frame legs.

If two switchgear cabinets are joined at their sides, as shown in FIG. 2, two vertical frame legs 10*a* and 10*b* extend parallel with each other and are connected with each other, as shown by a connector 60. The orientation of the diagonal lines of the rack RGD1 and RGD2 of the frame legs 10*a* and 10*b* with their insides ISI and IS2 and their outsides AS1 and AS2 are shown in the drawing. The attachment of the associated rear walls 50.1 and 50.2 at their associated frame legs 10*a*, or 10*b*, remains unchanged from that of FIG. 1. The same applies to the mounting plates 35.1 and 35.2 with respect to the rear wall 50.1 and 50.2.

The base leg 21 of the cable conduit 20 extends over the profiled sides 12.1 and 14.1 of the frame leg 10*a*, as well as over the profiled sides 14.2 and 12.2 of the frame leg 10*b*, wherein transition sections bridge the connecting sections of the frame legs in the same manner. Furthermore, the base leg 21 of the cable conduit 20 covers the connector 80 with sections 23.1, 23.2 and 23.3. The connector 60 is connected with the profiled sides 13.1 and 13.2 of the two frame legs 10*a* and 10*b*.

The cable reception space of the cable conduit 20 is optimally connected to the insides IS1 and IS2 of the two vertical frame legs 10*a* and 10*b*, which are connected with each other. If the lateral legs 26 and 27 are divided into single spring tabs, it is possible to conduct the cables at many places out of both sides of the cable conduit 20. The same applies to the insertion of cables. A seal is inserted between the connector 60 and the frame legs 10*a* and 10*b*.

What is claimed is:

1. In a cable conduit for a switchgear cabinet, having a rack assembled from frame legs, at least one of the frame legs having several profiled sides on an inside facing an interior, which extend at an angle with respect to each other and to a diagonal line of the rack and have a row of fastening receivers, wherein the cable conduit has a U-shaped profiled receiving section with a base leg and two lateral legs and can be closed by a cover section which can be locked on the lateral legs, the improvement comprising:

the base leg (21) of the profiled receiving section (20) matched to one of at least a portion of a contour defined by the profiled sides (11, 12, 13, 14, 15) of the inside (IS) of a frame leg (10) of the frame legs, and the profiled sides (11.1 to 14.1 and 11.2 to 14.2, 15) of the insides (IS1, IS2) of two frame legs (10*a*, 10*b*) connected with each other and connected with the profiled sides.

2. In the cable conduit in accordance with claim 1, wherein the base leg (21) has sections (22, 23, 24, 25) aligned parallel with the profiled sides (12, 13, 14, 15) of the frame leg (10) and forms a contact contour which is essentially complementary to the contour of the inside (IS) of the frame leg (10).

3. In the cable conduit in accordance with claim 1, wherein the base leg (21) has sections (22, 23.1, 23.2, 24) aligned parallel to the profiled sides (12.1, 13.1 and 13.2, 12.2) of the two frame legs (10*a*, 10*b*) which are connected with each other and form a contact contour which is complementary to the contour of the insides (IS1, IS2) of the two frame legs (10*a*, 10*b*).

4. In the cable conduit in accordance with claim 3, wherein in an area of diagonal lines (RGD) of the rack the frame legs (10, 10*a*, 10*b*) have connecting sections (15) bridged by transition sections (25) of the base leg (21) at a distance.

5. In the cable conduit in accordance with claim 4, wherein the frame legs (10, 10*a*, 10*b*) are designed mirror-reversed with respect to the diagonal line (RGD) of the rack.

6. In the cable conduit in accordance with claim 5, wherein the sections (22 to 24, 22, 23.1, 23.2, 24) of the cable conduit (20) contacted with the profiled sides (11 to 14, 11.1 to 14.1 and 11.2 to 14.2) have fastening bores in congruency with the fastening receivers of the profiled sides.

7. In the cable conduit in accordance with claim 1, wherein in an area of diagonal lines (RGD) of the rack the frame legs (10, 10*a*, 10*b*) have connecting sections (15) bridged by transition sections (25) of the base leg (21) at a distance.

8. In the cable conduit in accordance with claim 1, wherein the frame legs (10, 10*a*, 10*b*) are designed mirror-reversed with respect to the diagonal line (RGD) of the rack.

9. In the cable conduit in accordance with claim 1, wherein a plurality of sections (22 to 24, 22, 23.1, 23.2, 24) of the cable conduit (20) contacted with the profiled sides (11 to 14, 11.1 to 14.1 and 11.2 to 14.2) have fastening bores in congruency with the fastening receivers of the profiled sides.

* * * * *